United States Patent
Kim et al.

(10) Patent No.: US 8,717,914 B2
(45) Date of Patent: May 6, 2014

(54) METHOD FOR CONTROLLING INTERFERENCE

(75) Inventors: Sung Kyung Kim, Daejeon (KR); Sung Cheol Chang, Daejeon (KR); Hyun-Jae Kim, Incheon (KR); Won-Ik Kim, Daejeon (KR); Chul Sik Yoon, Seoul (KR); Jee Hwan Ahn, Daejeon (KR)

(73) Assignees: Samsung Electronics Co., Ltd., Suwon-si (KR); Electronics and Telecommunications Research Institute, Daejeon (KR)

( * ) Notice: Subject to any disclaimer, the term of this patent is extended or adjusted under 35 U.S.C. 154(b) by 845 days.

(21) Appl. No.: 12/770,210

(22) Filed: Apr. 29, 2010

(65) Prior Publication Data

US 2010/0278063 A1 Nov. 4, 2010

(30) Foreign Application Priority Data

Apr. 29, 2009 (KR) .................. 10-2009-0037712
Apr. 20, 2010 (KR) .................. 10-2010-0036322

(51) Int. Cl.
*H04L 12/26* (2006.01)
*H04L 12/28* (2006.01)
*H04B 7/00* (2006.01)

(52) U.S. Cl.
USPC ................ 370/252; 370/254; 370/277

(58) Field of Classification Search
USPC ............................................. 370/252
See application file for complete search history.

(56) References Cited

U.S. PATENT DOCUMENTS

| | | | |
|---|---|---|---|
| 7,877,097 B2* | 1/2011 | Zhu et al. ................ | 455/446 |
| 2005/0227699 A1* | 10/2005 | Schreuder et al. ........ | 455/453 |
| 2005/0250502 A1* | 11/2005 | Laroia et al. ............. | 455/447 |
| 2007/0280170 A1* | 12/2007 | Kawasaki .................. | 370/331 |
| 2007/0280183 A1* | 12/2007 | Cho et al. .................. | 370/338 |
| 2009/0258665 A1* | 10/2009 | Bourlas et al. ............ | 455/522 |
| 2009/0291692 A1* | 11/2009 | Kazmi et al. ............ | 455/452.2 |
| 2009/0323663 A1* | 12/2009 | Nakatsugawa .......... | 370/343 |
| 2010/0039948 A1* | 2/2010 | Agrawal et al. .......... | 370/252 |
| 2011/0013582 A1* | 1/2011 | Ding et al. ............... | 370/329 |
| 2011/0207494 A1* | 8/2011 | Zhu et al. .................. | 455/509 |

FOREIGN PATENT DOCUMENTS

EP 1734666 A1 * 12/2006

* cited by examiner

*Primary Examiner* — Faruk Hamza
*Assistant Examiner* — Abu-Sayeed Haque
(74) *Attorney, Agent, or Firm* — Jefferson IP Law, LLP

(57) ABSTRACT

A method for controlling interference between a plurality of neighboring base stations for a terminal by a serving base station of the terminal in a communication system is provided. The method includes receiving interference amount information on a first region of a downlink frame from the terminal, determining an interference amount estimate for the first region based on the received interference amount information, comparing the determined interference amount estimate with an interference amount tolerance for the first region; and transmitting an interference indicator requesting reduction in transmission power for the first region to the plurality of neighboring base stations when the interference amount estimate exceeds the interference amount tolerance.

14 Claims, 12 Drawing Sheets

METHOD FOR CONTROLLING INTERFERENCE

PRIORITY

This application claims the benefit under 35 U.S.C. §119 (a) of a Korean patent application filed on Apr. 29, 2009 filed in the Korean Intellectual Property Office and assigned Serial No. 10-2009-0037712, and a Korean patent application filed on Apr. 20, 2010 in the Korean Intellectual Property Office and assigned Serial No. 10-2010-0036322, the entire disclosures of both of which are hereby incorporated by reference.

JOINT RESEARCH AGREEMENT

The presently claimed invention was made by or on behalf of the below listed parties to a joint research agreement. The joint research agreement was in effect on or before the date the claimed invention was made and the claimed invention was made as a result of activities undertaken within the scope of the joint research agreement. The parties to the joint research agreement are 1) Samsung Electronics Co., Ltd. And 2) Electronics and Telecommunications Research Institute.

BACKGROUND OF THE INVENTION

1. Field of the Invention

The present invention relates to a method for controlling interference. More particularly, the present invention relates to a method for controlling interference between adjacent cells in a communication system in accordance with an Orthogonal Frequency Division Multiplexing Access (OFDMA) scheme.

2. Description of the Related Art

A communication system in an Orthogonal Frequency Division Multiplexing Access (OFDMA) scheme whose frequency reuse factor is 1 controls interference between adjacent cells by a sub-channel configuration different from adjacent cells for each cell.

However, according to the scheme, as a load is increased in the cell, the effect of the interference control is reduced. Further, in order for a terminal close to a boundary of cells including Carrier to Interference and Noise Ratio (CINR) to obtain a targeted value, when a base station in the corresponding cell increases transmission power, the interference between adjacent cells occurs. Thus, the performance of adjacent cells is degraded.

Therefore, in order to overcome performance degradation due to the co-channel interference affected by other cells at the boundary of cells in the communication system according to the OFDMA scheme, the communication system can use Fractional Frequency Reuse (FFR) that orthogonally divides all the sub-carriers into a plurality of sub-bands and then, properly arranges the sub-bands between cells that do not use some of the sub-bands in each cell, thereby making it possible to mitigate the co-channel interference between adjacent cells.

However, a problem exists in that an autonomy network configuration or a mobile base station environment that does not permit communication between base stations controlling each cell cannot use the frequency reuse scheme or the fractional frequency reuse scheme. In addition, even in a case of permitting communication between the base stations, it is difficult to improve the performance of the system while guaranteeing communication between terminals at the boundary of cells only by using the fractional frequency reuse without power control.

Therefore, a need exists for a method for controlling interference between adjacent cells in a communication system.

SUMMARY OF THE INVENTION

An aspect of the present invention is to address at least the above-mentioned problems and/or disadvantages and to provide at least the advantages described below. Accordingly, an aspect of the present invention is to provide a method for controlling downlink interference that occurs between base stations using the same frequency band.

In accordance with an aspect of the present invention, a method for controlling interference between a plurality of neighboring base stations for a terminal by a serving base station of the terminal in a communication system that communicates between the base stations is provided. The method includes receiving interference amount information on a first region of a downlink frame from the terminal by the serving base station, determining an interference amount estimate for the first region by the serving base station based on the interference amount information, comparing the interference amount estimate with an interference amount tolerance for the first region by the serving base station, and transmitting an interference indicator requesting reduction in transmission power for the first region to the plurality of neighboring base stations by the serving base station if it is determined that the interference amount estimate exceeds the interference amount tolerance.

In accordance with another aspect of the present invention, a method for controlling interference between a plurality of neighboring base stations for a terminal by a serving base station of the terminal in a communication system that cannot communicate between the base stations is provided. The method includes receiving interference amount information on a first region of a first downlink frame transmitted by the serving base station from the terminal, by the serving base station, determining an interference amount estimate for the first region by the serving base station based on the interference amount information, determining an interference level for the first region by the serving base station according to the interference amount estimate based on an interference amount tolerance for the first region, determining transmission power of an interference indicator broadcasting region for the first region by the serving base station according to the interference level, and transmitting pilot sub-carriers as the transmission power by the serving base station in the interference indicator broadcasting region.

In accordance with yet another aspect of the present invention, a method for controlling interference affecting neighboring cells by a base station in a communication system that cannot communicate between the base stations is provided. The method includes determining an interference level of a first base station for a service region of a second base station according to a Carrier to Interference and Noise Ratio (CINR) or a Received Signal Strength Indication (RSSI) of a broadcasting region in a downlink frame of a second base station adjacent to the first base station, determining transmission power for a lower region in a downlink frame of the first base station by the first base station according to the interference level, and transmitting the lower region as the transmission power by the first base station.

Other aspects, advantages, and salient features of the invention will become apparent to those skilled in the art from the following detailed description, which, taken in conjunction with the annexed drawings discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments can be made without departing from the scope and spirit of present invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Unless explicitly described to the contrary, the word "comprise" and variations such as "comprises" or "comprising" will be understood to imply the inclusion of stated elements but not the exclusion of any other elements.

Exemplary embodiments of the present invention provide a terminal that may designate a Mobile Station (MS), a terminal, a Mobile Terminal (MT), a Subscriber Station (SS), a Portable Subscriber Station (PSS), a User Equipment (UE), an Access Terminal (AT), and the like, and may include functions of all or a portion of the MT, the SS, the PSS, the UE, and the like.

Exemplary embodiments of the present invention also provide a Base Station (BS) that may designate an Access Point (AP), a Radio Access Station (RAS), a node B, a Base Transceiver Station (BTS), and the like, and may include functions of all or a portion of the AP, the RAS, the node B, the BTS, and the like.

Hereinafter, a method for controlling interference according to an exemplary embodiment of the present invention will be described in more detail with reference to the accompanying drawings.

In an exemplary implementation, a method for controlling interference between neighboring base stations when communication occurs between base stations in a communication system in an Orthogonal Frequency Division Multiplexing Access (OFDMA) scheme will be described with reference to FIGS. 1 to 4.

Figure 1:
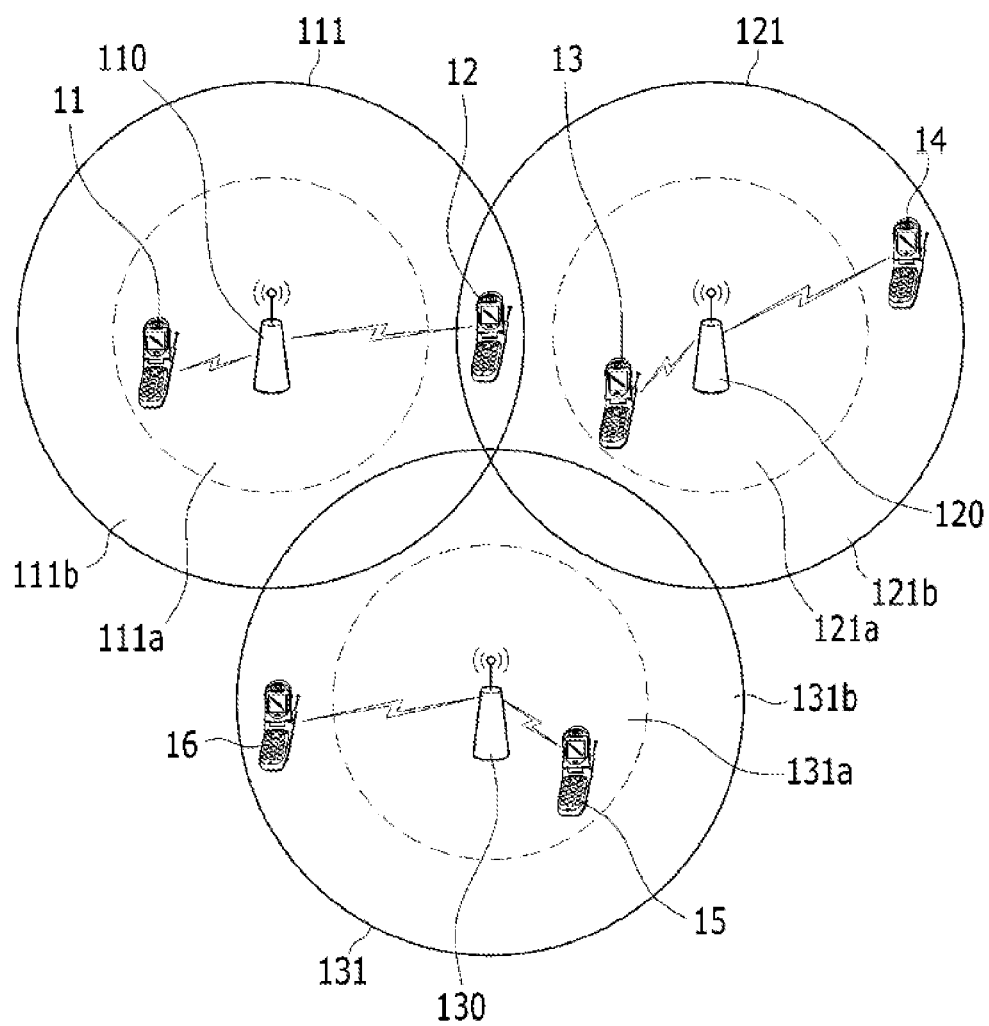
FIG. 1 is a diagram illustrating a configuration of a communication system according to an exemplary embodiment of the present invention.

FIG. 1 is a diagram illustrating a configuration of a communication system according to an exemplary embodiment of the present invention.

Referring to FIG. 1, the communication system communicates with a plurality of wireless terminals, i.e., a first terminal 11, a second terminal 12, a third terminal 13, a fourth terminal 14, a fifth terminal 15, and a sixth terminal 16 via a plurality of base stations, that is, a first base station 110, a second base station 120 and the third base station 130. Herein, the plurality of base stations use the same radio resources and are connected through a network to allow communication between the base stations.

The first base station 110 communicates with the first terminal 11 and the second terminal 12 that are positioned in a region of a first cell 111 corresponding to a service region of the first base station 110. Herein, the first cell 111 is divided into a first region 111a and a second region 111b.

When the first terminal 11 is positioned in the first region 111a of the first cell 111, the first base station 110 communicates with the first terminal 11 through a portion of entire radio resources according to the Fractional Frequency Reuse (FFR) scheme.

When the second terminal 12 is positioned in the second region 111b of the first cell 111, the first base station 110 communicates with the second terminal 12 through a portion of the entire radio resources according to the FFR scheme.

At this time, the radio resource used for communication with the terminal where the first base station 110 is positioned in the first region 111a of the first cell 111 does not overlap with the radio resource used for communication with the terminal where the first base station 110 is positioned in the second region 111b of the first cell 111.

The second base station 120 communicates with the third terminal 13 and the fourth terminal 14 that are positioned in the region of the second cell 121 corresponding to a service region of the second base station 120. Herein, the second cell 121 is divided into a first region 121a and a second region 121b.

When the third terminal 13 is positioned in a first region 121a of the second cell 121, the second base station 120 communicates with the third terminal 13 through a portion of the entire radio resources according to the FFR scheme.

When the fourth terminal 14 is positioned in a second region 121b of the second cell 121, the second base station 120 communicates with the fourth terminal 14 through a portion of the entire radio resources according to the FFR scheme.

At this time, the radio resource used for communication with the terminal where the second base station 120 is positioned in the first region 121a of the second cell 121 does not overlap with the radio resource used for communication with the terminal where the second base station 120 is positioned in the second region 121b of the second cell 121.

The third base station 130 communicates with the fifth terminal 15 and the sixth terminal 16 that are positioned in a region of a third cell 131 corresponding to a service region of the third base station 130. Herein, the third cell 131 is divided into the first region 131a and the second region 131b.

When the fifth terminal 15 is positioned in a first region 131a of the third cell 131, the third base station 130 communicates with the fifth terminal 15 through a portion of the entire radio resources according to the FFR scheme.

When the sixth terminal 16 is positioned in a second region 131b of the third cell 131, the third base station 130 communicates with the sixth terminal 16 through a portion of the entire radio resources according to the FFR scheme.

At this time, the radio resource used for communication with the terminal where the third base station 130 is positioned in the first region 131a of the third cell 131 does not overlap with the radio resource used for communication with the terminal where the third base station 130 is positioned in the second region 131b of the third cell 131.

A structure of a downlink frame transmitted by each base station in the communication system illustrated in FIG. 1 will be described with reference to FIGS. 2A to 2C.

Figure 2A:
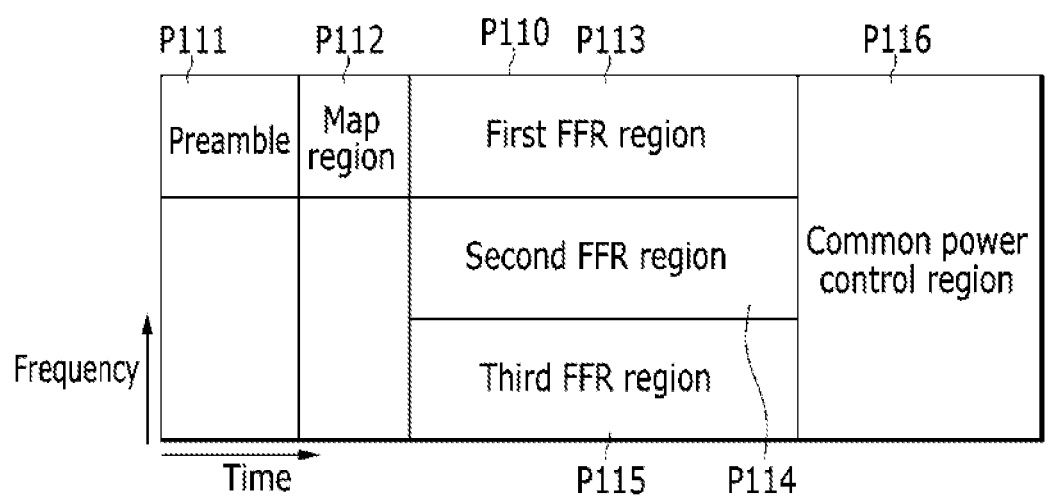
FIGS. 2A to 2C are diagrams illustrating a structure of a downlink frame according to exemplary embodiments of the present invention.
Figure 2B:
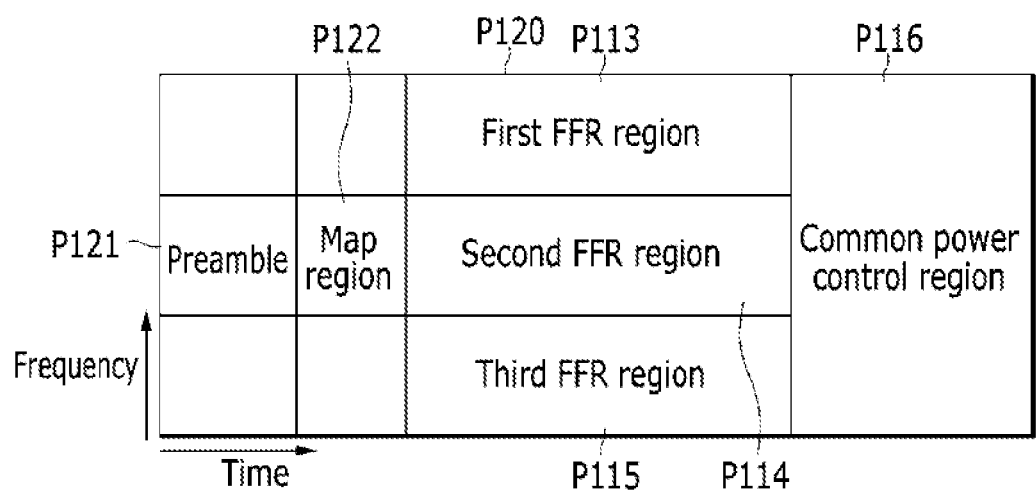
Figure 2C:
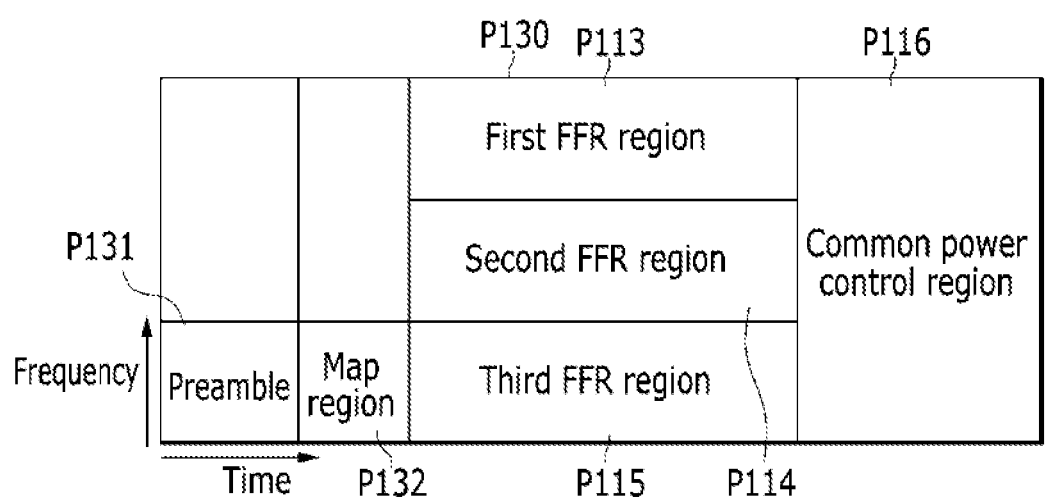

FIGS. 2A to 2C are diagrams illustrating a structure of a downlink frame according to exemplary embodiments of the present invention.

FIG. 2A illustrates a structure of a downlink frame transmitted by a first base station 110, FIG. 2B illustrates a structure of a downlink frame transmitted by a second base station 120, and FIG. 2C illustrates a structure of a downlink frame transmitted by a third base station 130.

Referring to FIG. 2A, a first downlink frame P110 transmitted by the first base station 110 includes a preamble P111, a map region P112, a first FFR region P113, a second FFR region P114, a third FFR region P115, and a common power control region P116.

The preamble P111 is positioned at a first symbol of the first downlink frame P110 for frame synchronization, cell search, carrier frequency offset estimate, or channel estimate.

The map region P112 includes a Frame Control Header (FCH) and a map message. The FCH is a header section informing frame configuration information and the map message is a message informing results that resources are dynamically allocated to the terminal.

The first FFR region P113 is allocated to the terminal positioned in a second region 111b of a first cell 111.

The second FFR region P114 is allocated to the terminal positioned in a first region 111a of the first cell 111.

The third FFR region P115 is allocated to the terminal positioned in the first region 111a of the first cell 111.

The common power control region P116, which is a region having a Frequency Reuse Factor (FRF) of 1 is a region where power control is performed in order to improve performance of the communication system.

Herein, the first FFR region P113 is a dedicated resource region of the first base station 110 and the first base station 110 may transmit the first FFR region P113 at transmission power higher than the second FFR region P114 or the third FFR region P115, and may transmit the second FFR region P114 or the third FFR region P115 at the limited transmission power in order to limit the interference affecting the terminal positioned in a region of cells adjacent to the first cell 111.

Referring to FIG. 2B, a second downlink frame P120 transmitted by the second base station 120 includes a preamble P121, a map region P122, a first FFR region P113, a second FFR region P114, a third FFR region P115, and a common power control region P116.

The preamble P121 is positioned at a first symbol of the second downlink frame P120 for frame synchronization, cell search, carrier frequency offset estimate, or channel estimate.

The map region P122 includes an FCH and a map message. The FCH is a header section informing frame configuration information and the map message is a message informing results that resources are dynamically allocated to the terminal.

The first. FFR region P113 is allocated to the terminal positioned in a first region 121a of a second cell 121.

The second FFR region P114 is allocated to the terminal positioned in a second region 121b of the second cell 121.

The third FFR region P115 is allocated to the terminal positioned in the first region 121a of the second cell 121.

The common power control region P116, which is a region having an FRF of 1 is a region where power control is performed in order to improve performance of the communication system.

Herein, the second FFR region P114 is a dedicated resource region of the second base station 120. The second base station 120 may transmit the second FFR region P114 at transmission power higher than the first FFR region P113 or the third FFR region P115, and may transmit the first FFR region P113 or the third FFR region P115 at limited transmission power in order to limit interference affecting the terminal positioned in a region of cells adjacent to the second cell 121.

Referring to FIG. 2C, a third downlink frame P130 transmitted by a third base station 130 includes a preamble P131, a map region P132, a first FFR region P113, a second FFR region P114, a third FFR region P115, and a common power control region P116.

The preamble P131 is positioned at a first symbol of the third downlink frame P130 for frame synchronization, cell search, carrier frequency offset estimate, or channel estimate.

The map region P132 includes an FCH and a map message. The FCH is a header section informing frame configuration information and the map message is a message informing results that resources are dynamically allocated to the terminal.

The first FFR region P113 is allocated to the terminal positioned in a first region 131a of a third cell 131.

The second FFR region P114 is allocated to the terminal positioned in the first region 131a of the third cell 131.

The third FFR region P115 is allocated to the terminal positioned in a second region 131b of the third cell 131.

The common power control region P116, which is a region having an FRF of 1 is a region where power control is performed in order to improve performance of the communication system.

Herein, the third FFR region P115 is a dedicated resource region of the third base station 130. The third base station 130 may transmit the third FFR region P115 at transmission power higher than the first FFR region P113 or the second FFR region P114, and may transmit the first FFR region P113 or the second FFR region P114 at the limited transmission power in order to limit the interference affecting the terminal positioned in a region of cells adjacent to the third cell 131.

Hereinafter, a method for controlling interference of base stations adjacent to a second terminal 12 by the first base station 110 of the communication system according to an exemplary embodiment of the present invention will be described with reference to FIG. 3.

Figure 3:
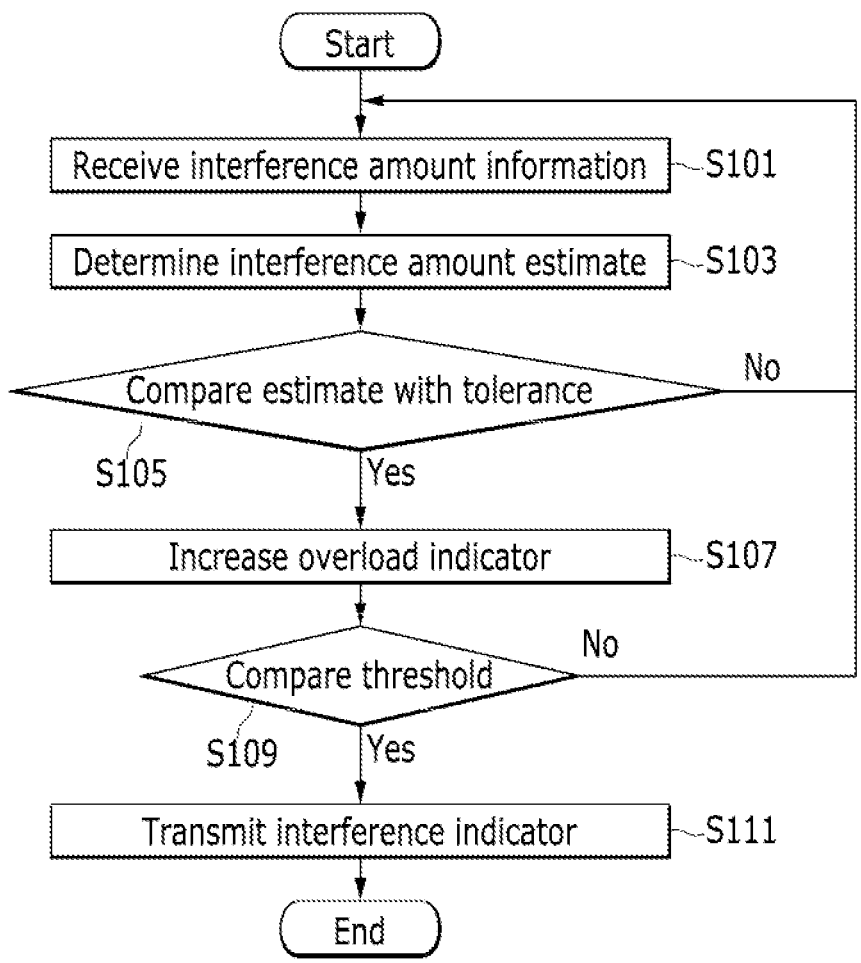
FIG. 3 is a diagram illustrating a method for controlling interference according to an exemplary embodiment of the present invention.

FIG. 3 is a diagram illustrating a method for controlling interference according to an exemplary embodiment of the present invention.

Referring to FIG. 3, in step S101, a first base station 110 receives interference amount information from a second terminal 12 positioned in a second region 111*b* of a first cell 111.

Herein, the received interference amount information includes Carrier to Interference and Noise Ratio (CINR), path loss, and Received Signal Strength Indication (RSSI) that are measured by the second terminal 12 with respect to the first FFR region 113 of the first downlink frame P110 transmitted by the first base station 110.

In step S103, the first base station 110 determines an interference amount estimate for the first FFR region P113 based on the received interference amount information.

Herein, the first base station 110 may determine the interference amount estimate (i) for the first FFR region P113 according to Equation 1.

$$I = L \cdot P / CINR \quad \text{(Equation 1)}$$

In Equation 1, L indicates the path loss included in the interference amount information, P indicates transmission power for the first FFR region P113 of the first downlink frame P110 transmitted by the first base station 110, the CINR indicates the CINR included in the interference amount information.

Hereinafter, the first base station 110 determines whether the interference amount estimate exceeds an interference amount tolerance by comparing the determined interference amount estimate with the interference amount tolerance for the first FFR region P113 in step S105.

If it is determined that the interference amount estimate exceeds the interference amount tolerance, the first base station 110 increases overload indicator for the first FFR region P113 by 1 in step S107.

Herein, the overload indicator indicates the frequency where the interference amount estimate exceeds the interference amount tolerance and the initial value may be set to 0.

In step S109, the first base station 110 determines whether the frequency where the interference amount estimate exceeds the interference amount tolerance exceeds the permissible frequency by comparing the overload indicator with a preset threshold.

If it is determined that the frequency exceeding the interference amount tolerance exceeds the permissible frequency, the first base station 110 transmits the interference indicator for the first FFR region P113 to the base stations adjacent to the first base station 110 in step S111.

Thereby, the first base station 110 reduces transmission power for the first FFR region P113 by the base station receiving the interference indicator, such that the interference of the base stations adjacent to the second terminal 12 may be controlled.

In step S105, if it is determined that the interference amount estimate does not exceed the interference amount tolerance, the first base station 110 receives the interference amount information from the second terminal 12 again, returns to step S101 and performs the subsequent steps.

In step S109, if it is determined that the frequency exceeding the interference amount estimate does not exceed the permissible frequency, the first base station 110 receives the interference amount information from the second terminal 12 again, returns to step S101 and performs the subsequent steps:

Hereinafter, a method for controlling interference of base stations adjacent to the second terminal 12 by the first base station 110 of the communication system according to an exemplary embodiment of the present invention will be described with reference to FIG. 4.

Figure 4:
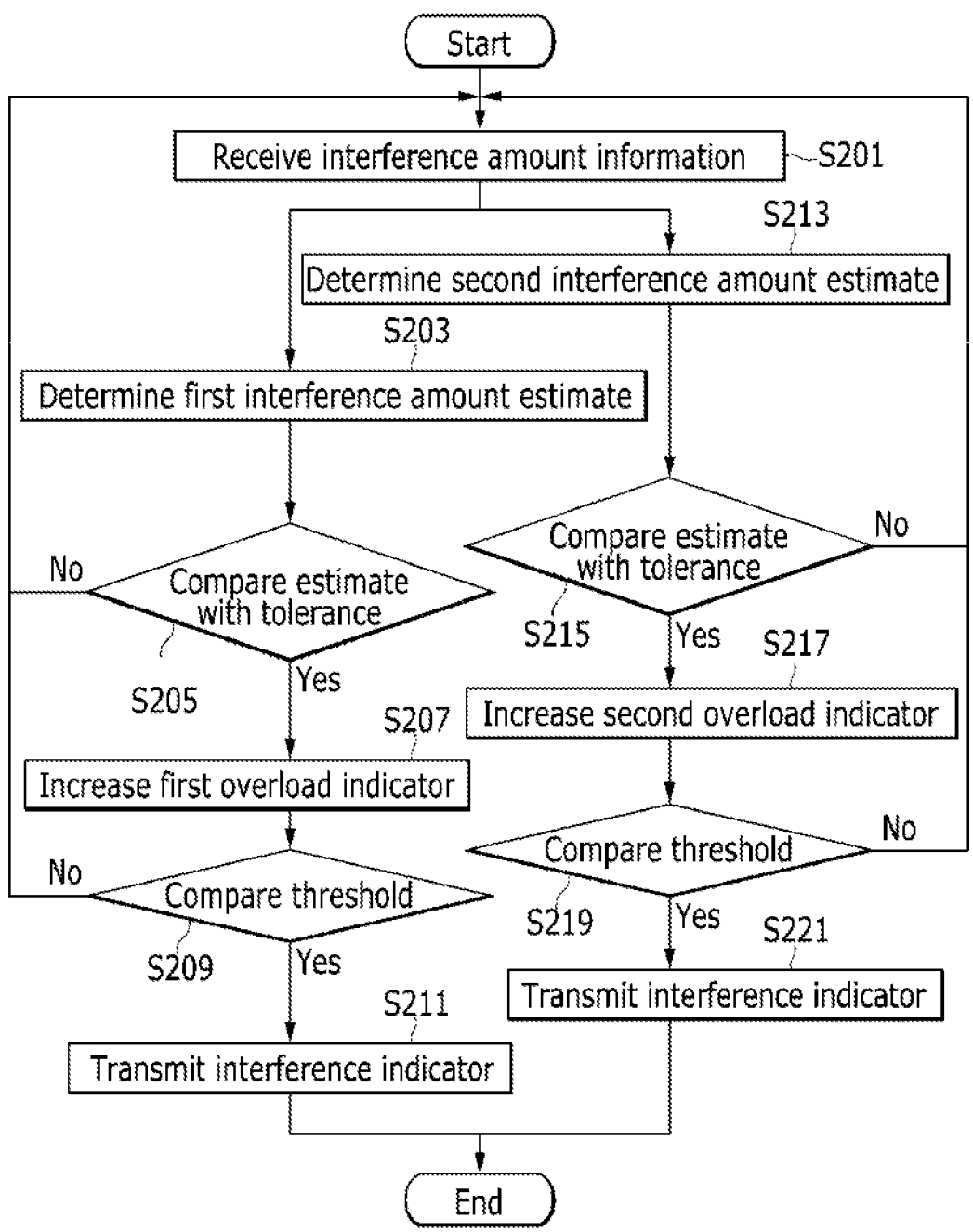
FIG. 4 is a diagram illustrating a method for controlling interference according to an exemplary embodiment of the present invention.

FIG. 4 is a diagram illustrating a method for controlling interference according to an exemplary embodiment of the present invention.

Referring to FIG. 4, in step S201, a first base station 110 receives interference amount information from a second terminal 12 positioned in a second region 111*b* of a first cell 111.

Herein, the received interference amount information includes a CINR, a first path loss, and an RSSI that are measured by the second terminal 12 for a first FFR region P113 of a first downlink frame transmitted by the first base station 110.

Further, the received interference amount information may further include second path loss measured by the second terminal 12 for the first FFR region P113 of a second downlink frame P120 transmitted by a second base station 120 and third path loss measured by the second terminal 12 for the first. FFR region P113 of a third downlink frame P130 transmitted by a third base station 130.

In step S203, the first base station 110 determines an interference amount estimate (i.e., a first interference amount estimate) of the second base station 110 for the first FFR region P113 based on the received interference amount information.

Herein, the first base station 110 may determine the first interference amount estimate ($I_1$) according to Equation 2.

$$I_1 = (L \cdot P / CINR) \cdot \frac{C_2}{\sum_{m=1}^{3} C_m} \cdot \frac{\alpha}{G_1} \quad \text{(Equation 2)}$$

In Equation 2, L indicates the first path loss included in the interference amount information, P indicates transmission power for the first FFR region P113 of the first downlink frame P110 transmitted by the first base station 110, the CINR indicates the CINR included in the interference amount information.

Where $C_m$, which is a load of m-th base station for the first FFR region 113, is determined according to transmission power, a number of transmission bit, or a buffer size of the m-th base station and the load of the m-th base station may be received from the m-th base station.

Further, $G_1$ indicates a difference between the first path loss and the second path loss included in the interference amount information and $\alpha$ indicates constant.

In step S205, the first base station 110 determines whether the first interference amount estimate exceeds an interference amount tolerance by comparing the first interference amount estimate with the interference amount tolerance for the first FFR region P113.

When the first interference amount estimate exceeds the interference amount tolerance, the first base station 110 increases an overload indicator (i.e., a first overload indicator) of the second base station 120 for the first FFR region P113 by 1 in step S207.

Herein, the overload indicator indicates the frequency where the interference amount estimate exceeds the interference amount tolerance and the initial value may be set to 0.

In step S209, the first base station 110 determines whether the frequency where the first interference amount estimate exceeds the interference amount tolerance exceeds permissible frequency by comparing the first overload indicator with a preset threshold.

If it is determined that the frequency exceeding the interference amount tolerance exceeds the permissible frequency, the first base station 110 transmits the interference indicator for the first FFR region P113 to the second base station 120 in step S211.

Thereby, the first base station 110 reduces the transmission power for the first FFR region P113 by the second base station 120 receiving the interference indicator, such that the interference of the second base station for the second terminal 12 may be controlled.

Meanwhile, the first base station 110 determines the interference amount estimate (i.e., a second interference amount estimate) of the third base station 130 for the first FFR region P113 based on the received interference amount information in step S213.

Herein, the first base station 110 may determine the second interference amount estimate ($I_2$) according to Equation 3.

$$I_2 = (L \cdot P / CINR) \cdot \frac{C_3}{\sum_{m=1}^{3} C_m} \cdot \frac{\alpha}{G_2} \quad \text{(Equation 3)}$$

In Equation 3, L indicates the first path loss included in the interference amount information, P indicates the transmission power for the first FFR region P113 of the first downlink frame P110 transmitted by the first base station 110, the CINR indicates the CINR included in the interference amount information.

Where $C_m$, which is a load of m-th base station for the first FFR region 113, is determined according to the transmission power, the number of transmission bit; or the buffer size of the m-th base station and the load of the m-th base station may be received from the m-th base station. Further, $G_2$ indicates a difference between the first path loss and the third path loss included in the interference amount information and a indicates constant.

Hereinafter, the first base station 110 determines whether the second interference amount estimate exceeds the interference amount tolerance by comparing the second interference amount estimate with the interference amount tolerance for the first FFR region P113 in step S215.

When the second interference amount estimate exceeds the interference amount tolerance, the first base station 110 increases the overload indicator (i.e., a second overload indicator) of the third base station 130 for the first FFR region P113 by 1 in step S217.

Herein, the overload indicator indicates the frequency where the interference amount estimate exceeds the interference amount tolerance and the initial value may be set to 0.

In step S219, the first base station 110 determines whether the frequency where the second interference amount estimate exceeds the interference amount tolerance exceeds permissible frequency by comparing the second overload indicator with a preset threshold.

If it is determined that the frequency exceeding the interference amount tolerance exceeds the permissible frequency, the first base station 110 transmits the interference indicator for the first FFR region P113 to the third base station 130 in step S221.

Thereby, the first base station 110 reduces the transmission power for the first FFR region P113 by the third base station 130 receiving the interference indicator, such that the interference of the third base station 120 for the second terminal 12 may be controlled.

In step S205, if it is determined that the first interference amount estimate does not exceed the interference amount tolerance, the first base station 110 receives the interference amount information from the second terminal 12 again, returns to step S201 and performs the subsequent steps.

In step S209, if it is determined that the frequency exceeding the interference amount tolerance does not exceed the permissible frequency, the first base station 110 receives the interference amount information from the second terminal 12 again, returns to step S201 and performs the subsequent steps.

In step S215, if it is determined that the second interference amount estimate does not exceed the interference amount tolerance, the first base station 110 receives the interference amount information from the second terminal 12 again, returns to step S201 and performs the subsequent steps.

In step S219, if it is determined that the frequency exceeding the interference amount tolerance does not exceed the permissible frequency, the first base station 110 receives the interference amount information from the second terminal 12 again, returns to step S201 and performs the subsequent steps.

A method for controlling interference between neighboring base stations when the communication between the base stations cannot be performed in the communication system in the OFDMA scheme according to an exemplary embodiment of the present invention will be described with reference to FIGS. 5 to 8.

Figure 5:
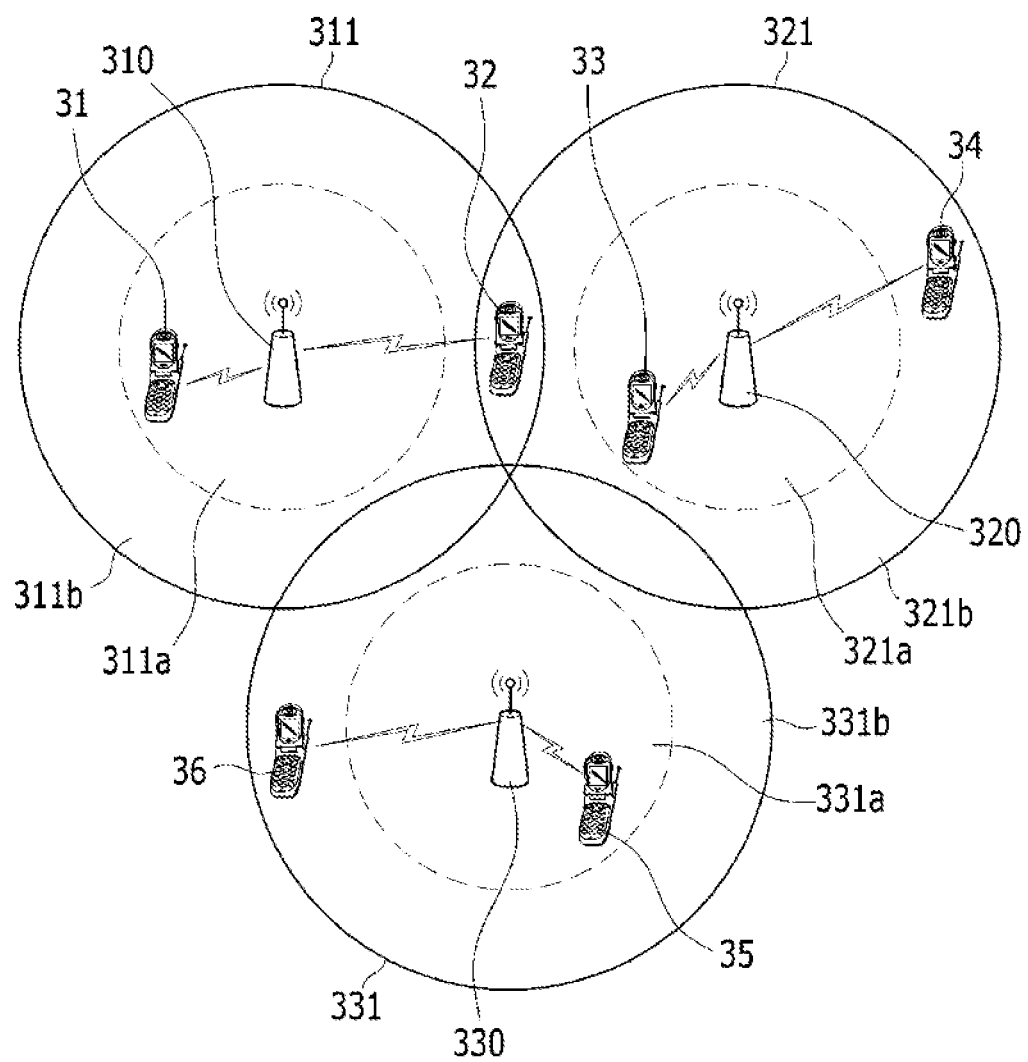
FIG. 5 is a diagram illustrating a configuration of a communication system according to an exemplary embodiment of the present invention.

FIG. 5 is a diagram illustrating a configuration of a communication system according to an exemplary embodiment of the present invention.

Referring to FIG. 5, the communication system communicates with a plurality of wireless terminals, i.e., a first terminal 31, a second terminal 32, a third terminal 33, a fourth terminal 34, a fifth terminal 35, and a sixth terminal 36 via a plurality of base stations, that is, a first base station 310, a second base station 320 and the third base station 330. Herein, the plurality of base stations use the same radio resource.

The first base station 310 communicates with the first terminal 31 and the second terminal 32 that are positioned in a region of a first cell 311 corresponding to a service region of the first base station 310

Herein, the first cell 311 is divided into a first region 311a and a second region 311b.

When the first terminal 31 is positioned in the first region 131a of the first cell 311, the first base station 310 communicates with the first terminal 31 through a portion of an entire radio resource according to the FFR scheme.

When the second terminal 32 is positioned in a second region 311b of the first cell 311, the first base station 310 communicates with the second terminal 32 through a portion of the entire radio resources according to the FFR scheme.

At this time, the radio resource used for communication with the terminal where the first base station 310 is positioned in the first region 311a of the first cell 311 does not overlap with the radio resource used for communication with the terminal where the third base station 310 is positioned in the second region 311b of the first cell 311.

The second base station 320 communicates with the third terminal 33 and the fourth terminal 34 that are positioned in a region of a second cell 321 corresponding to a service region of the second base station 320.

Herein, the second cell 321 is divided into a first region 321a and a second region 321b.

When the third terminal 33 is positioned in the first region 321a of the second cell 321, the second base station 320 communicates with the third terminal 33 through a portion of the entire radio resources according to the FFR scheme.

When the fourth terminal 34 is positioned in the second region 321b of the second cell 321, the second base station 320 communicates with the fourth terminal 34 through a portion of the entire radio resources according to the FFR scheme.

At this time, the radio resource used for communication with the terminal where the second base station 320 is positioned in the first region 321a of the second cell 321 does not overlap with the radio resource used for communication with the terminal where the second base station 320 is positioned in the second region 321b of the second cell 321.

The third base station 330 communicates with a fifth terminal 35 and a sixth terminal 36 that are positioned in a region of a third cell 331 corresponding to a service region of the third base station 330.

Herein, the third cell 331 is divided into a first region 331a and a second region 331b.

When the fifth terminal 35 is positioned in the first region 331a of the third cell 331, the third base station 330 communicates with the fifth terminal 35 through a portion of the entire radio resources according to the FFR scheme.

When the sixth terminal 36 is positioned in the second region 331b of the third cell 331, the third base station 330 communicates with the sixth terminal 36 through a portion of the entire radio resources according to the FFR scheme.

At this time, the radio resource used for communication with the terminal where the third base station 330 is positioned in the first region 331a of the third cell 331 does not overlap with the radio resource used for communication with the terminal where the third base station 330 is positioned in the second region 331b of the third cell 331.

Hereinafter, a structure of a downlink frame transmitted by each base station of the communication system illustrated in FIG. 5 will be described with reference to FIGS. 6A to 6C.

Figure 6A:
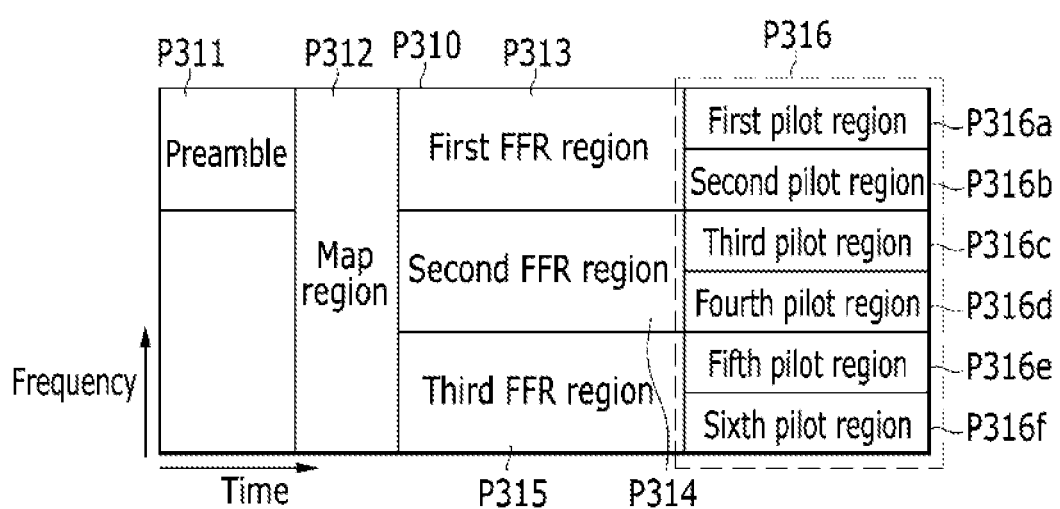
FIGS. 6A to 6C are diagrams illustrating a structure of a downlink frame according to exemplary embodiments of the present invention.
Figure 6B:
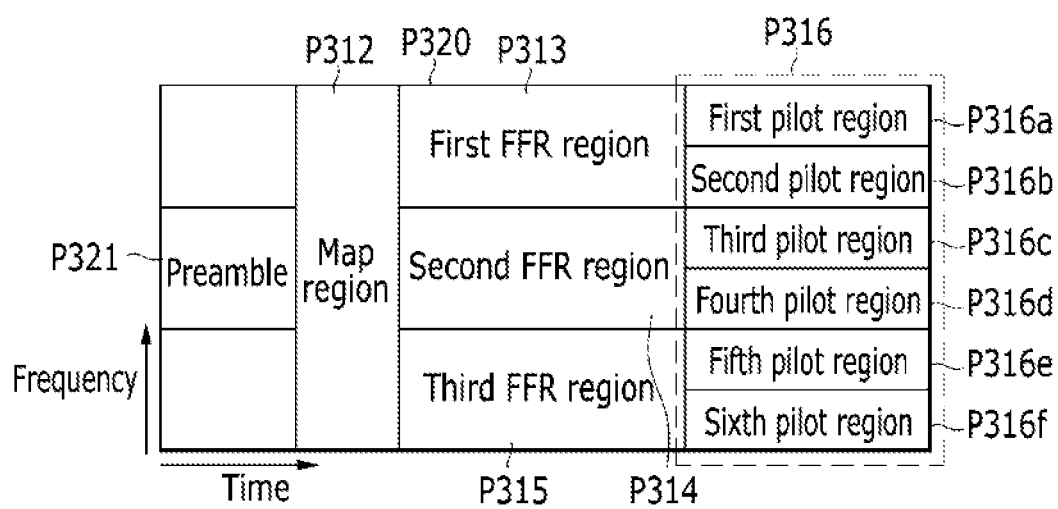
Figure 6C:
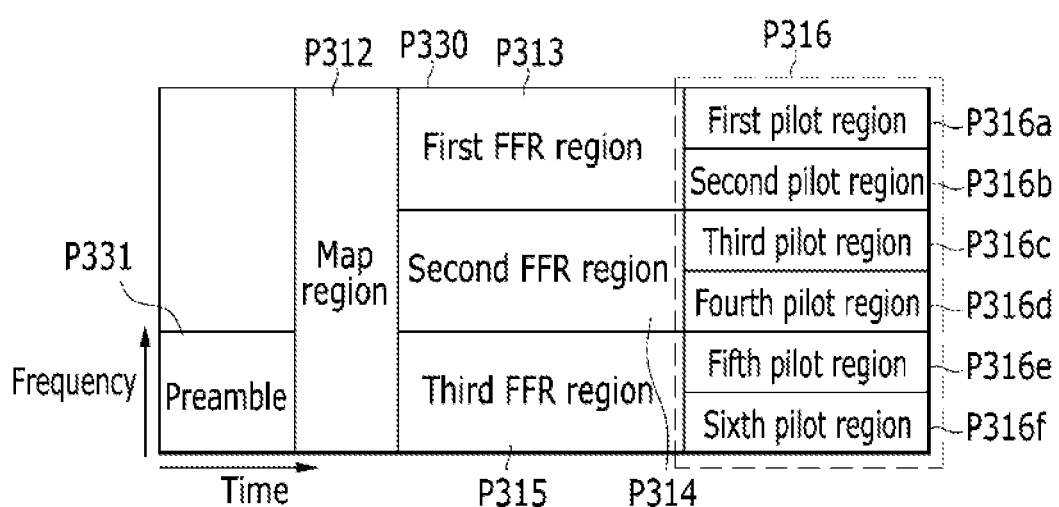

FIGS. 6A to 6C are diagrams illustrating a structure of a downlink frame according to exemplary embodiments of the present invention.

FIG. 6A illustrates a structure of a downlink frame transmitted by the first base station 310, FIG. 6B illustrates a structure of a downlink frame transmitted by the second base station 320, and FIG. 6C illustrates a structure of a downlink frame transmitted by the third base station 330.

Referring to FIG. 6A, a first downlink frame P310 transmitted by the first base station 310 includes a preamble P311, a map region P312, a first FFR region P313, a second FFR region P314, a third FFR region P315, and an interference indication zone P316. Herein, the interference indication zone P316 includes a first pilot region P316a, a second pilot region P316b, a third pilot region P316c, a fourth pilot region P316d, a fifth pilot region P316e, and a sixth pilot region P316f.

The preamble P311 is positioned at a first symbol of the first downlink frame P310 for frame synchronization, cell search, carrier frequency offset estimate, or channel estimate.

Herein, a frequency band used by the preamble P311 is the same as the frequency band used in a dedicated resource region of the first base station 310.

The map region P312 includes an FCH and a map message.

The FCH is a header section informing frame configuration information and the map message is a message informing results that resources are dynamically allocated to the terminal.

The first FFR region P313 is allocated to the terminal positioned in a second region 311b of the first cell 311.

Herein, the first FFR region P313 is a dedicated resource region of the first base station 310.

Further, since the first base station 310 cannot communicate with neighboring base stations, the first base station 210 detects the dedicated resource regions of neighboring base station through the preamble detection for the downlink frame transmitted by neighboring base stations and may determine the dedicated resource region of the first base station 310.

The second FFR region P314 is allocated to the terminal positioned in a first region 311a of the first cell 311.

The third FFR region P315 is allocated to the terminal positioned in the first region 311a of the first cell 311.

Herein, the first base station 310 may transmit the first FFR region P313 at transmission power higher than the second FFR region P314 or the third FFR region P315, and may transmit the second FFR region P314 or the third FFR region P315 at the limited transmission power in order to limit interference affecting the terminal positioned in a region of cells adjacent to the first cell 311.

The first pilot region P316a is an interference indicator broadcasting region in order to control the interference of the second base station 320 for the first FFR region P313 that is a dedicated resource region of the first base station 310.

Herein, the first base station 310 may transmit pilot subcarriers at transmission power corresponding to the corresponding interference level at the first pilot region P316a in order to inform the terminal or the second base station 320 positioned in the second cell 321 of the interference level of the second base station 320 for the first FFR region P313.

The second pilot region P316b is an interference indicator broadcasting region in order to control the interference of the third base station 330 for the first FFR region P313 that is a dedicated resource region of the first base station 310.

Herein, the first base station 310 may transmit pilot subcarriers at transmission power corresponding to the corresponding interference level at the second pilot region P316b in order to inform the terminal or the third base station 330 positioned in the third cell 331 of the interference level of the third base station 330 for the first FFR region P313.

The third pilot region P316c is a measurement region to determine the transmission power for the second FFR region P314 of the first downlink frame P310 transmitted by the first base station 310. The first base station 310 may measure an RSSI for the third pilot region P316c or request the measurement of a CINR, or the RSSI for the third pilot region P316c to the terminal and determine the transmission region for the second FFR region P314 based on the measured CINR or the RSSI.

The fifth pilot region P316e is a measurement region to determine the transmission power for the third FFR region P315 of the first downlink frame P310 transmitted by the first base station 310. The first base station 310 may measure the RSSI for the fifth pilot region P316e or request the measurement of the CINR or the RSSI for the fifth pilot region P316e to the terminal and determine the transmission region for the third FFR region P315 based on the measured CINR or the RSSI.

Referring to FIG. 6B, a second downlink frame P320 transmitted by a second base station 320 includes a preamble P321, a map region P312, a first FFR region P313, a second FFR region P314, a third FFR region P315, and an interference indication zone P316.

Herein, the interference indication zone P316 includes a first pilot region P316a, a second pilot region P316b, a third pilot region P316c, a fourth pilot region P316d, a fifth pilot region P316e, and a sixth pilot region P316f.

The preamble P321 is positioned at a first symbol of the first downlink frame P310 for frame synchronization, cell search, carrier frequency offset estimate, or channel estimate.

Herein, the frequency band used by the preamble P321 is the same as the frequency band used in the dedicated resource region of the second base station 320.

The map region P312 includes an FCH and a map message.

The FCH is a header section informing frame configuration information and the map message is a message informing results that resources are dynamically allocated to a terminal.

The first FFR region P313 is allocated to the terminal positioned in the first region 311a of a second cell 321.

The second FFR region P314 is allocated to the terminal positioned in the second region 311b of the second cell 321. Herein, the second FFR region P314 is a dedicated resource region of the second base station 320.

Further, since the second base station 320 cannot communicate with neighboring base stations, the second base station 320 detects the dedicated resource regions of neighboring base stations through the preamble detection for the downlink frame transmitted by neighboring base stations and may determine the dedicated resource region of the second base station 320.

The third FFR region P315 is allocated to the terminal positioned in the first region 311a of the second cell 321.

Herein, the second base station 320 may transmit the second FFR region P314 at transmission power higher than the first FFR region P313 or the third FFR region P315 and may transmit the first FFR region P313 or the third FFR region P315 at the limited transmission power in order to limit the interference affecting the terminal positioned in a region of cells adjacent to the second cell 321.

The first pilot region P316a is a measurement region to determine the transmission power for the first FFR region P313 of the second downlink frame P320 transmitted by the second base station 320.

The second base station 320 may measure an RSSI for the first pilot region P316a or request the measurement of a CINR or the RSSI for the fifth pilot region P316a to the terminal and determine the transmission region for the first FFR region P313 based on the measured CINR or the RSSI.

The third pilot region P316c is an interference indicator broadcasting region in order to control the interference of the first base station 310 for the second FFR region P314 that is a dedicated resource region of the second base station 320.

Herein, the second base station 320 may transmit pilot sub-carriers at transmission power corresponding to the corresponding interference level at the third pilot region P316c in order to inform the terminal or the first base station 310 positioned in the first cell 311 of the interference level of the first base station 310 for the second FFR region P314.

The fourth pilot region P316d is an interference indicator broadcasting region in order to control the interference of the third base station 330 for the second FFR region P314 that is a dedicated resource region of the second base station 320.

Herein, the second base station 320 may transmit pilot sub-carriers at transmission power corresponding to the corresponding interference level at the fourth pilot region P316d in order to inform the terminal or the third base station 330 positioned in the third cell 331 of the interference level of the third base station 330 for the second FFR region P314.

The sixth pilot region P316f is a measurement region to determine the transmission power for the third FFR region P315 of the second downlink frame P320 transmitted by the second base station 320.

The second base station 320 may measure the RSSI for the sixth pilot region P316f or request the measurement of the CINR or the RSSI for the sixth pilot region P316f to the terminal and determine the transmission region for the third FFR region P315 based on the measured CINR or the RSSI.

Referring to FIG. 6C, a third downlink frame P330 transmitted by a third base station 330 includes a preamble P331, a map region P312, a first FFR region P313, a second FFR region P314, the third FFR region P315, and an interference indication zone P316.

Herein, the interference indication zone P316 includes a first pilot region P316a, a second pilot region P316b, a third pilot region P316c, a fourth pilot region P316d, a fifth pilot region P316e, and a sixth pilot region P316f.

The preamble P331 is positioned at a first symbol of the first downlink frame P310 for frame synchronization, cell search, carrier frequency offset estimate, or channel estimate.

Herein, a frequency band used by the preamble P331 is the same as the frequency band used in the dedicated resource region of the third base station 330.

The map region P312 includes an FCH and a map message.

The FCH is a header section informing frame configuration information and the map message is a message informing results that resources are dynamically allocated to the terminal.

The first FFR region P313 is allocated to the terminal positioned in a first region 311a of a third cell 331.

The second FFR region P314 is allocated to the terminal positioned in the first region 311a of the third cell 331.

The third FFR region P315 is allocated to the terminal positioned in the second region 311b of the third cell 331.

Herein, the third FFR region P315 is a dedicated resource region of the third base station 330.

Further, since the third base station 330 cannot communicate with neighboring base stations, the third base station 330 detects the dedicated resource regions of neighboring base station through the preamble detection for the downlink frame transmitted by neighboring base stations and may determine the dedicated resource region of the third base station 330.

Herein, the third base station 330 may transmit the third FFR region P315 at transmission power higher than the first FFR region P313 or the second FFR region P314 and may transmit the first FFR region P313 or the second FFR region P314 at the limited transmission power in order to limit the interference affecting the terminal positioned in a region of cells adjacent to the third cell 331.

The second pilot region P316b is a measurement region to determine the transmission power for the first FFR region P313 of the third downlink frame P330 transmitted by the third base station 330.

The third base station 330 may measure the RSSI for the second pilot region P316b or request the measurement of a CINR or an RSSI for the second pilot region P316b to the terminal and determine the transmission region for the first FFR region P313 based on the measured CINR or the RSSI.

The fourth pilot region P316d is a measurement region to determine the transmission power for the second FFR region P314 of the third downlink frame P330 transmitted by the third base station 330.

The third base station 330 may measure the RSSI for the fourth pilot region P316d or request the measurement of the CINR or the RSSI for the fourth pilot region P316d to the terminal and determine the transmission region for the second FFR region P314 based on the measured CINR or the RSSI.

The fifth pilot region P316e is an interference indicator broadcasting region in order to control the interference of the first base station 310 for the third FFR region P315 that is a dedicated resource region of the third base station 330.

Herein, the third base station 330 may transmit pilot sub-carriers at transmission power corresponding to the corresponding interference level at the fifth pilot region P316e in order to inform the terminal or the first base station 310 positioned in the first cell 311 of the interference level of the first base station 310 for the third FFR region P315.

The sixth pilot region P316f is an interference indicator broadcasting region in order to control the interference of the second base station 320 for the third FFR region P315 that is a dedicated resource region of the third base station 330. Herein, the third base station 330 may transmit pilot sub-carriers at transmission power corresponding to the corresponding interference level at the sixth pilot region P316f in order to inform the terminal or the second base station 320 positioned in the second cell 321 of the interference level of the second base station 320 for the third FFR region P315.

Hereinafter, a method for controlling interference neighboring base stations of a second terminal 32 by a first base station 310 of the communication system according to an exemplary embodiment of the present invention will be described with reference to FIG. 7.

Figure 7:
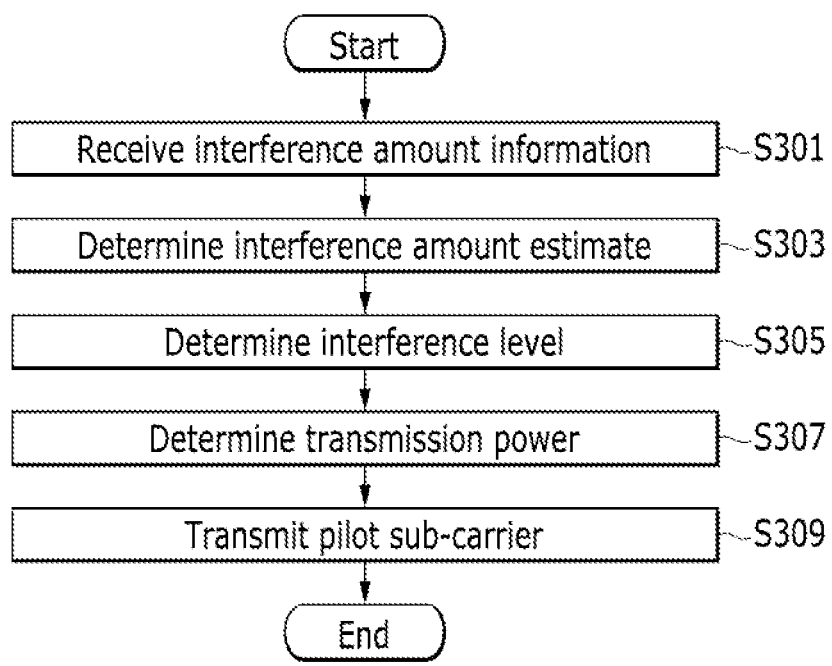
FIG. 7 is a diagram illustrating a method for controlling interference according to an exemplary embodiment of the present invention.

FIG. 7 is a diagram illustrating a method for controlling interference according to an exemplary embodiment of the present invention.

Referring to FIG. 7, in step S301, the first base station 310 receives interference amount information from the second terminal 32 positioned in the second region 311b of the first cell 311.

Herein, the received interference amount information includes a CINR, a path loss, and an RSSI that are measured by the second terminal 32 for the first FFR region P331 of the first downlink frame P310 transmitted by the first base station 310.

In step S303, the first base station 310 determines the interference amount estimate for a first FFR region P313 based on the received interference amount information.

Herein, the first base station 310 may determine the interference amount estimate (i) for the first FFR region P313 according to Equation 4.

$$I = L \cdot P / CINR \quad \text{(Equation 4)}$$

In Equation 4, L indicates a path loss included in the interference amount information, P indicates a transmission power for the first FFR region P313 of the first downlink frame P310 transmitted by the first base station 310, the CINR indicates the CINR included in the interference amount information.

In step S305, the first base station 310 determines the interference level for the first FFR region P313 by comparing the determined interference amount estimate with an interference amount tolerance for the first FFR region P313.

In step S307, the first base station 310 determines the transmission power of the pilot sub-carriers to be transmitted in the first pilot region P316a and the second pilot region P316b of the first downlink frame P310 according to the determined interference level.

At this time, when the interference level for the first FFR region P313 is large, the first base station 310 may set the transmission power of the pilot sub-carriers to be higher than the reference value.

In addition, when the interference level for the first FFR region P313 is small, the first base station 310 may set the transmission power of the pilot sub-carriers to be lower than the reference value and set the transmission power of the pilot sub-carriers to 0 in order to not transmit the pilot sub-carriers.

Thereafter, the first base station 310 transmits the pilot sub-carriers at the transmission power of the pilot sub-carriers to be transmitted in the first pilot region P316a and the second pilot region P316b of the first downlink frame P310 in step S309.

Hereinafter, a method for controlling interference affecting adjacent cells by a first base station 310 of a communication system according to an exemplary embodiment of the present invention will be described with reference to FIG. 8.

Figure 8:
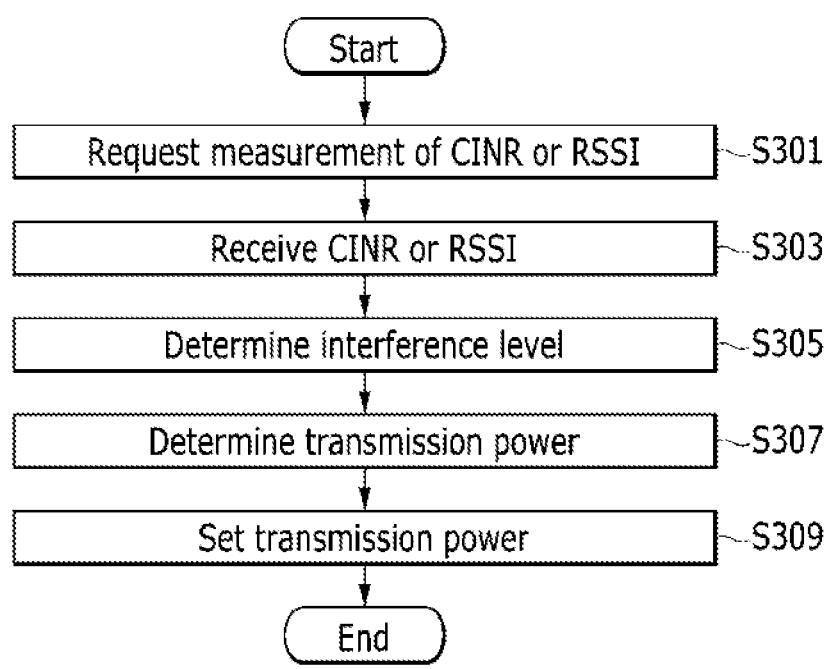
FIG. 8 is a diagram illustrating a method for controlling interference according to an exemplary embodiment of the present invention.

FIG. 8 is a diagram illustrating a method for controlling interference according to an exemplary embodiment of the present invention.

Referring to FIG. 8, in step S401, the first base station 310 requests the measurement of a CINR or an RSSI for a third pilot region P316c of a second downlink frame P320 transmitted by the second base station 320 in order to determine an interference level of the first base station 310 for the second FFR region P314 that is the dedicated resource region of the second base station 320 adjacent to the first base station 310 to the second terminal 32.

At this time, the first base station 310 may directly measure the CINR or the RSSI for the third pilot region P316c of the second downlink frame P320.

In step S403, the first base station 310 receives the CINR or the RSSI measured from the terminal.

Thereafter, the first base station 310 determines the interference level affecting the terminal positioned in the second region 321b of the second cell 321 by the first base station 310 according to the received CINR or RSSI in step S405.

In step S407, the first base station 310 determines the transmission power for the second FFR region P314 of the first downlink frame P310 transmitted by the first base station 310 according to the determined interference level.

Thereafter, the first base station 310 sets the transmission power of the second FFR region P314 to the determined transmission power and transmits the first downlink frame P310 in step S409.

In accordance with exemplary embodiments of the present invention, a communication system that can permit communication between base stations can perform power control through an exchange of interference control information between neighboring base stations to secure a data rate of the terminals positioned at a boundary of cells. Further, the communication system that does not permit communication between the base stations performs the power control through an interference display zone such that the power control is performed even in the communication system including mobile base stations that does not permit communication between the base stations, thereby making it possible to secure the data rate of the terminals positioned at the boundary of the cells.

Certain aspects of the present invention can also be embodied as computer readable code on a computer readable recording medium. A computer readable recording medium is any data storage device that can store data which can be thereafter read by a computer system. Examples of the computer readable recording medium include Read-Only Memory (ROM), Random-Access Memory (RAM), CD-ROMs, magnetic tapes, floppy disks, and optical data storage devices. The computer readable recording medium can also be distributed over network coupled computer systems so that the computer readable code is stored and executed in a distributed fashion. Also, functional programs, code, and code segments for accomplishing the present invention can be easily construed by programmers skilled in the art to which the present invention pertains.

While this invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for controlling interference between a plurality of neighboring base stations for a terminal by a serving base station of the terminal in a communication system that can communicate between the base stations, the method comprising:
receiving interference amount information on a first region of a downlink frame from the terminal by the serving base station;
determining an interference amount estimate for the first region by the serving base station based on the interference amount information;
comparing the interference amount estimate with an interference amount tolerance for the first region by the serving base station; and
transmitting an interference indicator requesting reduction in transmission power for the first region to the plurality of neighboring base stations by the serving base station if it is determined that the interference amount estimate exceeds the interference amount tolerance,
wherein the determining of the interference amount estimate comprises determining at least one of a Carrier to Interference and Noise Ratio (CINR) and a Received Signal Strength Indication (RSSI) for the first region included in the interference amount information and determining an estimate that is in proportion to a path loss and the transmission power for the first region included in the interference amount information and in inverse proportion to the CINR.

2. The method of claim 1, further comprising:
determining a first interference amount estimate corresponding to the interference amount estimate of a first neighboring base station for the first region based on the interference amount information by the serving base station;
comparing the first interference amount estimate with the interference amount tolerance by the serving base station; and
transmitting the interference indicator to the first neighboring base station by the serving base station when the first interference amount estimate exceeds the interference amount tolerance.

3. The method of claim 2, wherein the determining of the first interference amount estimate comprises determining a ratio of an entire load of the plurality of neighboring base stations to the load of the first neighboring base station by the serving base station.

4. The method of claim 2, wherein the determining of the first interference amount estimate comprises determining an estimate that is in proportion to a path loss and the transmission power of the serving base station for the first region included in the interference amount information and in inverse proportion to a Carrier to Interference and Noise Ratio (CINR) for the first region included in the interference amount information by the serving base station.

5. The method of claim 4, wherein the determining of the first interference amount estimate further comprises determining an estimate that is in inverse proportion to a difference between the path loss of the serving base station for the first region included in the interference amount information and the path loss of the first neighboring base station for the first region by the serving base station.

6. The method of claim 1, wherein the transmitting of the interference indicator comprises:
increasing an overload indicator indicating a frequency where the interference amount estimate exceeds the interference amount tolerance when the interference amount estimate exceeds the interference amount tolerance by the serving base station; and
transmitting the interference indicator to the plurality of neighboring base stations by the serving base station when the frequency corresponding to the overload indicator exceeds a preset permissible frequency.

7. The method of claim 1, wherein the first region comprises a radio resource region that allows the serving base station the transmission power higher than remaining regions other than the first region in the downlink frame.

8. A method for controlling interference between a plurality of neighboring base stations for a terminal by a serving base station of the terminal in a communication system that cannot communicate between the base stations, the method comprising:
receiving interference amount information on a first region of a first downlink frame transmitted by the serving base station from the terminal, by the serving base station;
determining an interference amount estimate for the first region by the serving base station based on the interference amount information;
determining an interference level for the first region by the serving base station according to the interference amount estimate based on an interference amount tolerance for the first region;
determining transmission power of an interference indicator broadcasting region for the first region by the serving base station according to the interference level; and
transmitting pilot sub-carriers as the transmission power by the serving base station in the interference indicator broadcasting region,
wherein the determining of the interference level comprises comparing the determined interference amount estimate with an interference amount tolerance for the first region, and
wherein the determining of the interference amount estimate comprises determining an estimate that is in proportion to a path loss and the transmission power for the first region included in the interference amount information and in inverse proportion to the CINR by the serving base station.

9. The method of claim 8, wherein the determining of the interference amount estimate comprises determining a Carrier to Interference and Noise Ratio (CINR) and a Received Signal Strength Indication (RSSI) for the first region included in the interference amount information.

10. The method of claim 8, wherein the first region comprises a radio resource region that allows the serving base station the transmission power higher than remaining regions other than the first region in the downlink frame.

11. A method for controlling interference affecting neighboring cells by a base station in a communication system that cannot communicate between the base stations, the method comprising:
determining an interference amount estimate for a first region by a serving base station based on interference amount information;
determining an interference level of a first base station for a service region of a second base station according to at least one of a Carrier to Interference and Noise Ratio (CINR) and a Received Signal Strength Indication (RSSI) of a broadcasting region in a downlink frame of a second base station adjacent to the first base station;

determining transmission power for a lower region in a downlink frame of the first base station by the first base station according to the interference level; and transmitting the lower region as the transmission power by the first base station, wherein the determining of the interference level comprises comparing the determined interference amount estimate with an interference amount tolerance for the first region, and wherein the determining of the interference amount estimate comprises determining an estimate that is in proportion to a path loss and the transmission power for the first region included in the interference amount information and in inverse proportion to the CINR by the serving base station.

12. The method of claim 11, wherein the lower region comprises a radio resource region that allows the second base station the transmission power higher than the remaining regions other than the lower region in the downlink frame of the second base station.

13. The method of claim 11, further comprising:
receiving at least one of the CINR and the RSSI in the broadcasting region from a terminal positioned in a service region of the first base station by the first base station, prior to the determining of the interference level.

14. The method of claim 11, further comprising:
measuring at least one of the CINR and the RSSI in the broadcasting region by the first base station, prior to the determining of the interference level.

* * * * *